US006465901B2

(12) United States Patent
Croes (10) Patent No.: US 6,465,901 B2
(45) Date of Patent: Oct. 15, 2002

(54) DEVICE FOR USING WIND POWER OR GENERATING WIND AND PITCH SYSTEM FOR SUCH A DEVICE

(75) Inventor: Valere Croes, Hasselt (BE)

(73) Assignee: Turbowinds N.V./S.A., Overijse (BE)

( * ) Notice: Subject to any disclaimer, the term of this patent is extended or adjusted under 35 U.S.C. 154(b) by 31 days.

(21) Appl. No.: 09/788,323

(22) Filed: Feb. 15, 2001

(65) Prior Publication Data

US 2001/0013703 A1 Aug. 16, 2001

(30) Foreign Application Priority Data

Feb. 16, 2000 (EP) .............................................. 00200545

(51) Int. Cl.[7] ................................................. F03D 9/00
(52) U.S. Cl. .............................. 290/55; 290/44; 416/31
(58) Field of Search .............................. 290/43, 44, 54, 290/55; 416/31

(56) References Cited

U.S. PATENT DOCUMENTS

| 4,193,005 A | * | 3/1980 | Kos et al. ...................... 290/44 |
| 4,201,514 A | | 5/1980 | Huetter ......................... 416/37 |
| 4,239,977 A | * | 12/1980 | Strutman ...................... 290/44 |
| 4,257,736 A | | 3/1981 | Jacobs .......................... 416/51 |
| 4,423,333 A | * | 12/1983 | Rossman ...................... 290/44 |
| 4,435,646 A | * | 3/1984 | Coleman et al. ............... 290/44 |
| 4,534,705 A | | 8/1985 | Selestram et al. ........... 416/162 |
| 5,083,039 A | * | 1/1992 | Richardson et al. .......... 290/44 |
| 5,584,655 A | * | 12/1996 | Deering ........................ 290/44 |
| 6,285,090 B1 | * | 9/2001 | Brutsaert et al. .............. 290/44 |

FOREIGN PATENT DOCUMENTS

| DE | 28 25 061 | 12/1979 |
| EP | 0 021 810 | 7/1981 |
| FR | 2 355 179 | 1/1978 |
| GB | 2 010 980 | 7/1979 |
| JP | 58048873 | 5/1984 |
| JP | 59 176472 | 10/1984 |

* cited by examiner

Primary Examiner—Nicholas Ponomarenko
(74) Attorney, Agent, or Firm—Townsend and Townsend and Crew LLP (57) ABSTRACT

A device for using power of a moving fluid or generating movement in a fluid such as a wind turbine is provided with radially placed blades and a pitch change system. The pitch change system comprises a central pitch change shaft and guide shafts, with a sliding means slidably coupling the guide shafts to the pitch change shaft. Additionally, a blade coupler couples the sliding means to the blades, whereupon controlled movement of the pitch change shaft along its central axis causes a corresponding change in the pitch angle of the blades. The guide shafts are preferably provided with alignment means.

19 Claims, 8 Drawing Sheets

DEVICE FOR USING WIND POWER OR GENERATING WIND AND PITCH SYSTEM FOR SUCH A DEVICE

BACKGROUND OF THE INVENTION

The present invention relates to a pitch control system for controlling the pitch of one or more blades. The pitch control system of the present invention is useful in any device that uses or converts the power of a moving fluid, or any device that transfers energy to, or generates movement in, a fluid. Such devices include windmills, wind motors, wind machines, wind turbines, water turbines and the like. More particularly, the present invention relates to a device for using the power of a moving fluid or generating movement in a fluid (such as a windmill, a wind motor, wind machine or wind turbine, water turbine, etc.) having radially placed blades capable of being rotated, and having a pitch control system for regulating the pitch of the blades, wherein the pitch control system comprises a pitch change shaft, means for translating the pitch change shaft in a horizontal direction, and coupling means between the pitch change shaft and the blades, said coupling means effecting a change in the pitch of the blades upon translation of the pitch change shaft.

The present invention furthermore relates to a hub for a windmill, wind motor, wind machine, wind turbine, etc. comprising a pitch control system.

A typical windmill, wind motor, wind machine or wind turbine comprising a pitch change element is known from European patent application EP-A-21810. Such a known device comprises a pitch change shaft extending in a hub of the device. The change shaft extends horizontally, and a toggle means are attached to the pitch change shaft. A change in position of the change shaft changes the position of the toggle means, which causes an arm, attached at one end to the toggle means and at the other end to an axis of a blade, to move, thereby, rotating the axis of the blade. The efficiency on the pitch system and of the device as a whole is dependent on a number of factors, among which the precision in pitch angle control is an important factor. Wear and tear are also important since they influence, among others the down time of a system (time needed for repairs and thus improductive) and the life time of a device. Wear and tear furthermore may after some time, result is a loss of precision in pitch control.

In the known system the toggle means exert transversal forces at right angles to the axis of the pitch change shaft directly on the pitch change shaft. Transversal forces on the pitch change shaft have the effect that rather than a movement of the pitch change shaft causing a change in the pitch of the system, in seeking the path of least resistance, a movement of the pitch change shaft causes a twisting of the pitch change shaft. Such a twisting causes wear and tear on the pitch change shaft. Such wear and tear ultimately necessitates repair of the pitch change shaft and thereby reduces the efficiency of the device. The transversal forces may even lead to the destruction of the pitch change shaft system. Equally or even more important is the effect that this twisting has on the precision in pitch angle control. A movement of the pitch change shaft results in a twisting of the pitch change system or partially in a twisting of the pitch change system and partially in a pitch change of the blades. The relation between the position of the pitch change shaft and the pitch angle of the blades thus becomes less precise (or even imprecise) and consequently the pitch angle control is less precise. A less precise pitch angle control reduces the efficiency of the device.

It is remarked that U.S. Pat. No. 4,534,705, patent abstracts of Japan, vol. 009, No. 034, and the abstract of JP 59 176472 each show devices having sliding means that slide over a central common shaft and to which pivoting means, coupled to the blades are provided. A change in position of the sliding means relative to the central shaft changes the pitch of the blades. The toggle means exert, via the sliding means transversal forces on the central shaft.

U.S. Pat. No. 4,257,736 discloses a wind mill which also does not comprise, for each blade, either a guide shaft and guide shaft sliding means, or first and second sub-coupling means. The blades are pivotably connected between a pair of parallel spaced plates such that the blade angle is adjusted in accordance with the relative spacing of the plates. This known device can basically only operate at two biasing arrangements and has very limited pitch control.

French Patent application FR 2355179 discloses a wind machine having a central axis to which side bars are connected, the side bars being movable in a direction along the central axis. Movement of the side bars changes the position of the blades.

Accordingly, it is desirable to provide a more efficient pitch control system having improved pitch angle control and reduced wear and tear on the pitch change shaft.

The mentioned and further objects of the invention will be apparent from and elucidated with reference to the embodiments described hereinafter.

SUMMARY OF THE INVENTION

The present invention provides pitch control systems, and devices using the same, having improved pitch angle control and reduced wear and tear on the pitch change shaft.

A device in accordance with the present invention includes coupling means comprising, for each blade, a guide shaft extending substantially parallel to each other and substantially parallel to the pitch change shaft. The coupling means further comprises first sub-coupling means coupling the pitch change shaft to the relevant guide shaft, said first sub-coupling means comprising guide shaft sliding means, and second sub-coupling means coupling the guide shaft sliding means to the relevant blade.

In a device in accordance with the present invention, the transversal forces exerted on the pitch change shaft perpendicular to the pitch change shaft axis are strongly reduced, due to the presence of the guide shafts extending substantially in parallel to the pitch change shaft. This enables better pitch control and reduces wear and tear. For a wind turbine this means better power control, for a wind machine this means stronger winds at the same power.

In one embodiment, the guide shafts are placed at substantially equal distances from the pitch change shaft, and arranged in a substantially symmetrical arrangement around the pitch change shaft. This provides for a symmetric pattern of reaction forces on the guide shaft, thus strongly reducing or even eliminating asymmetric loads on the central pitch change shaft.

The wear and tear on the guide shafts and any asymmetric forces the guide shafts exert on the pitch change shaft are also reduced and preferably minimised. To this end each guide shaft is preferably provided with adjustment means for adjusting the position and orientation of the said guide shaft. Such adjustment means enables the position of each guide shaft relative to the other guide shaft(s) and the pitch change shafts as well as their mutual parallelism to be controlled. The overall position of the guide shaft governs their mutual distances, whereas the orientation governs the (lack of) mutual parallelism. This allows for precision alignment of the guide shafts, which enables a further reduction or even elimination of internal hyperstatic reaction forces in the pitch system, enabling an improved pitch angle control and reduced wear and tear.

In one embodiment, the adjustment means comprises two or more adjustment sub-means separated from each other by some distance along the guide shaft. By using two or more adjustment sub-means separated some distance along the guide shaft the orientation (and thereby the mutual parallelism of the guide shafts) is more easily controllable.

In one embodiment, a first and a second adjustment sub-means are located at or near either end of each guide shaft. Such an arrangement provides for a large freedom in regulating/changing the orientations of the guide shafts, and furthermore the risk of interference with the sliding means is reduced. In one embodiment, each first and second adjustment sub-means includes 3 or more adjustment bolts in an adjustment sleeve. Using the adjustment bolts, the position and orientation of the guide shafts is easily and simply changeable.

In another embodiment, each first and second adjustment sub-means, includes six bolts regularly distributed over a circle, e.g., around the circumference of a guide shaft. Such an arrangement of bolts enables an easy and accurate positioning and orientation of the guide shafts.

In one embodiment each guide shaft, further includes a flat area for each adjustment bolt, the normal of each flat area being parallel to the longitudinal axis of the corresponding bolt. In this manner a bolt does not exert (or only to a very small amount) forces on the guide shaft other than directed along the longitudinal axis of the bolt (e.g., radially inward with respect to the guide shaft). Such an arrangement of opposing bolts helps prevent, or at least reduce torque from being exerted on the guide shaft.

In a further embodiment, each sliding means comprise two sliding sleeves, separated some distance from each other along the guide shaft, the inner diameter of said sliding sleeves exhibiting, initially, a difference.

Friction between the sliding means may be a cause of wear and tear as well as of generation of unwanted forces. Thus, in one embodiment, each sliding means comprises two guide sleeves, one initially having a slightly smaller inner diameter compared to the other guide sleeve. The sleeve having the smaller inner diameter will wear more than the other sleeve, until the diameters are substantially equal. The sliding means will then glide over the guide shaft guided by two sleeves of equal diameter, separated from each other along the guide shaft. Any sideways forces are in this arrangement distributed over two sleeves and over some distance along the guide shaft. This reduces the risk of concentration of harmful forces and thereby average wear and tear.

According to one aspect of the invention, an apparatus is provided having two or more radially placed blades capable of being rotated, and having a pitch system for regulating the pitch of the two or more blades. The pitch system typically comprises a pitch change shaft substantially extending in a horizontal direction, and coupling means coupling the pitch change shaft and the blades. The coupling means effects a change in the pitch of the blades upon translation of the pitch change shaft, wherein the coupling means typically comprises, for each blade, a guide shaft extending substantially parallel to each other and substantially parallel to the pitch change shaft, first sub-coupling means coupling the pitch change shaft to the relevant guide shaft, said first sub-coupling means comprising guide shaft sliding means, and second sub-coupling means coupling the guide shaft sliding means to the corresponding blade.

According to another aspect of the invention, a pitch control system is provided for controlling the pitch angle of two or more blades. The pitch control system typically comprises a pitch control shaft having a central translation axis, and a coupling system for coupling the pitch control shaft to the two or more blades. The coupling system typically comprises, for each blade, a guide shaft extending substantially parallel to the pitch control shaft, a guide shaft coupler, slidably coupled to the guide shaft, for coupling the guide shaft to the pitch control shaft, and a blade coupler for coupling the guide shaft coupler to the blade. The coupling system is arranged such that controlled movement of the pitch control shaft along the central translation axis causes a corresponding change in the pitch angle of the two or more blades.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The Figures are not drawn to scale. In the Figures, like reference numerals generally refer to like parts.

DESCRIPTION OF THE SPECIFIC EMBODIMENTS

Figure 1:
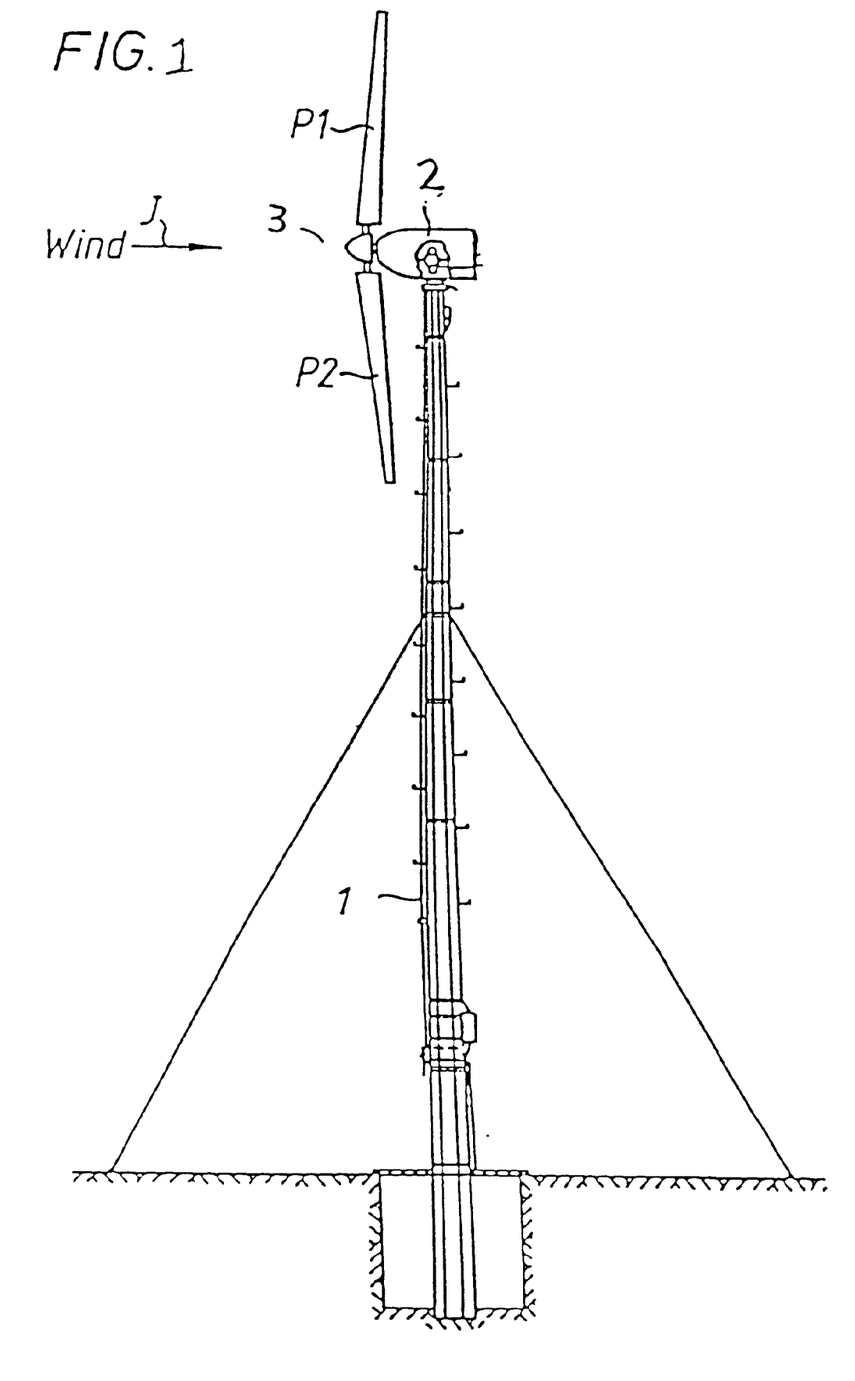
FIG. 1 schematically shows an exemplary wind turbine.

FIG. 1 shows in partial cross-sectional view a wind turbine. The turbine comprises on a pole 1 a structure 2, which houses means to convert the rotational energy of the blades P1, P2 into electrical energy or energy of another form. The blades are connected to a hub 3.

To enable more efficient use of the wind energy, the blade pitch (i.e. the angle between the wind direction J and the blades) is changed by a pitch change system that regulates the pitch of the blades. A known pitch change system 10 is shown in partial cross-sectional view in FIG. 2. The pitch system 10 comprises a change shaft 11, extending horizontally (or more precise along the direction J of the wind). The change shaft 11 is pushed by a spring 12. Toggle means 13 are directly coupled to the change shaft, and are coupled to an arm 14. A change in the position of change shaft 11, causes a translation of toggle means 13, which causes arm 14 to rotate around axis 15, thus changing the angle (pitch) of the blade P1 in respect to direction J.

Figure 2:
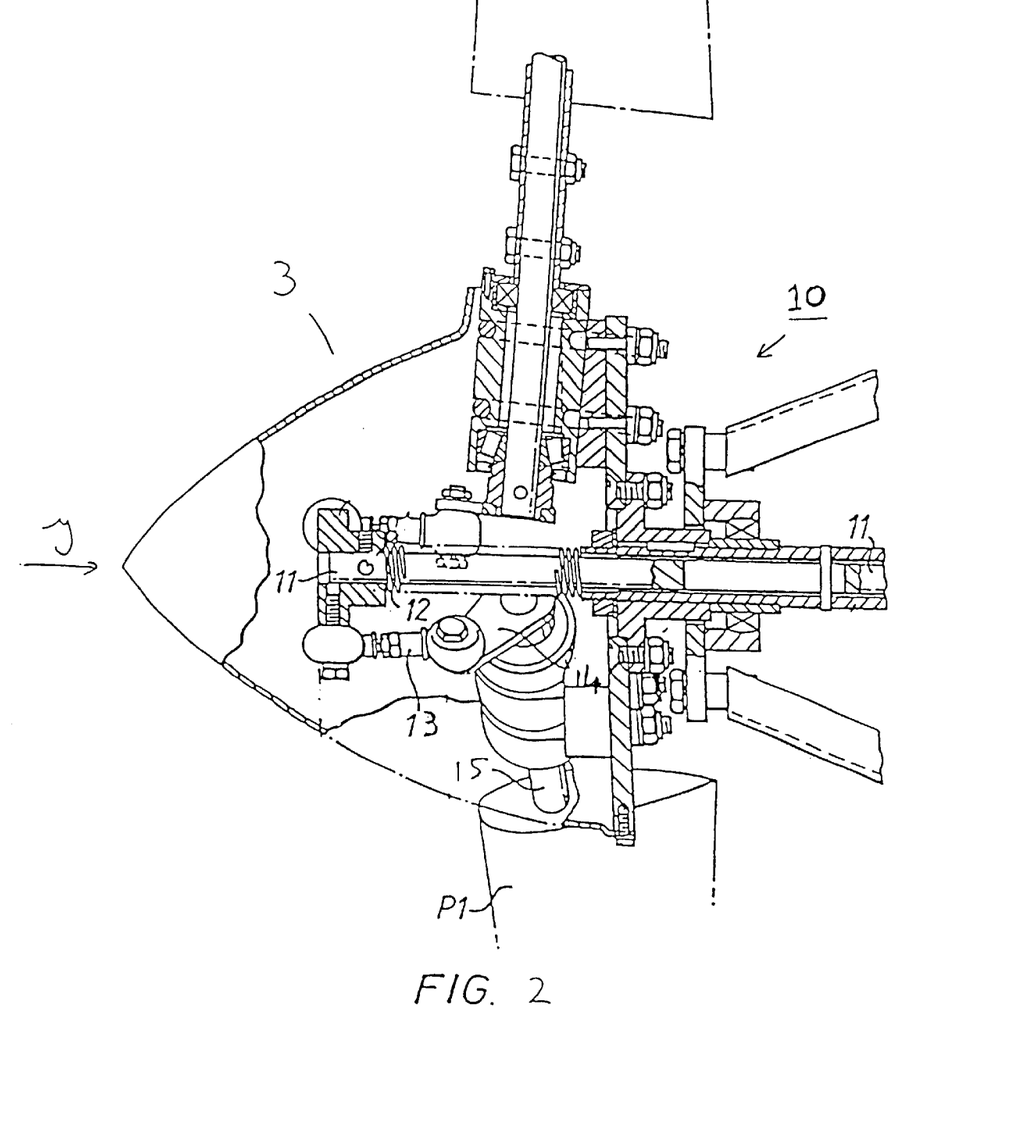
FIG. 2 schematically shows a hub of, or for, a wind turbine comprising a known coupling system.

The forces exerted via toggle means 13 on axis 15 and vice-versa comprise components perpendicular to the axis of pitch change shaft 11. Such transversal forces cause the problems described above, and in particular a reduction in the precision of the pitch angle control and wear and tear on pitch change shaft 11. Imprecision in the pitch angle control reduces the efficiency of the device, wear and tear increases the costs of the device and the transversal forces may even cause destruction of the pitch change system.

Figure 3:
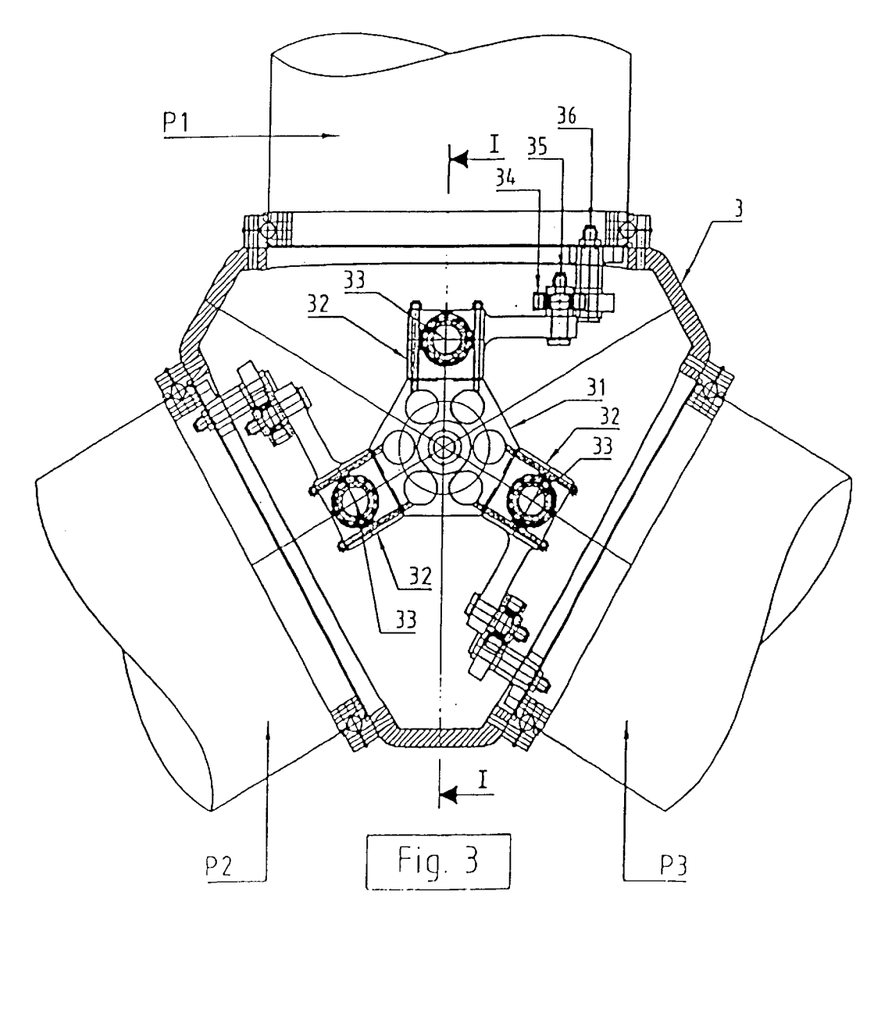
FIGS. 3, 4 and 5 show schematically in some detail part of a wind turbine in accordance with the invention.
Figure 4:
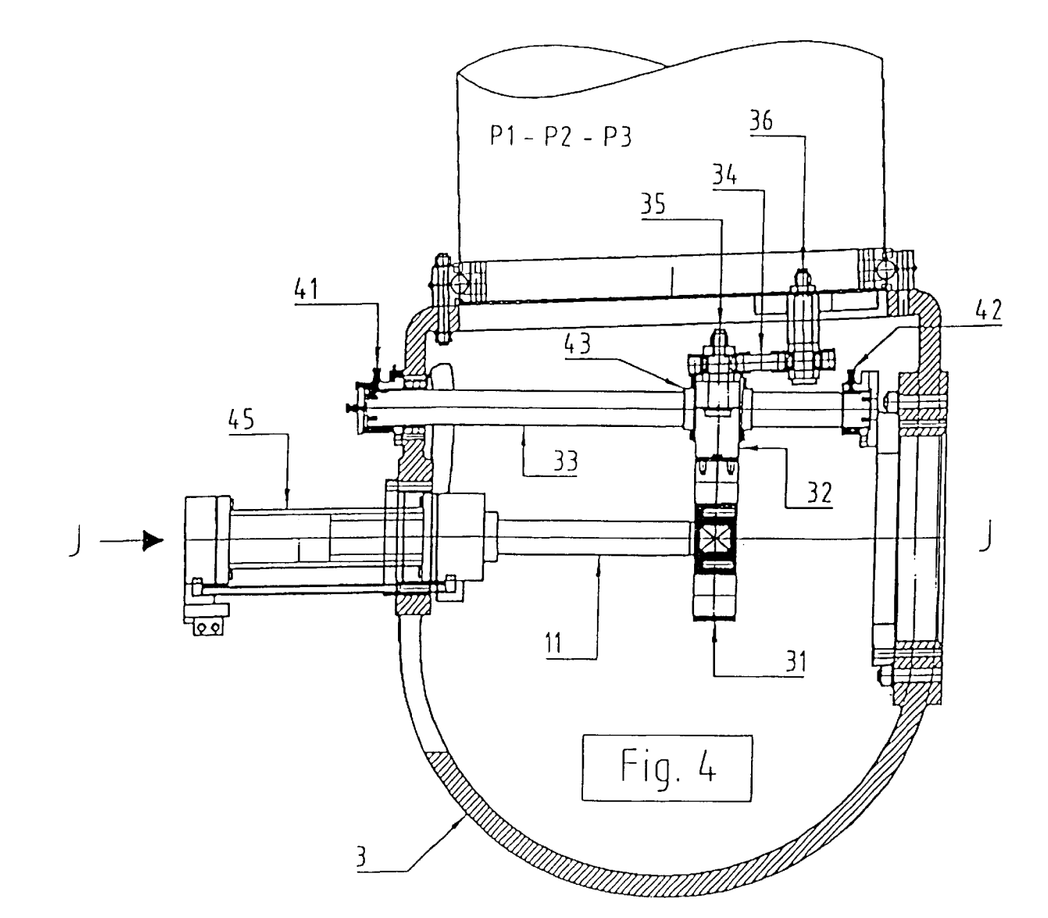
Figure 5:
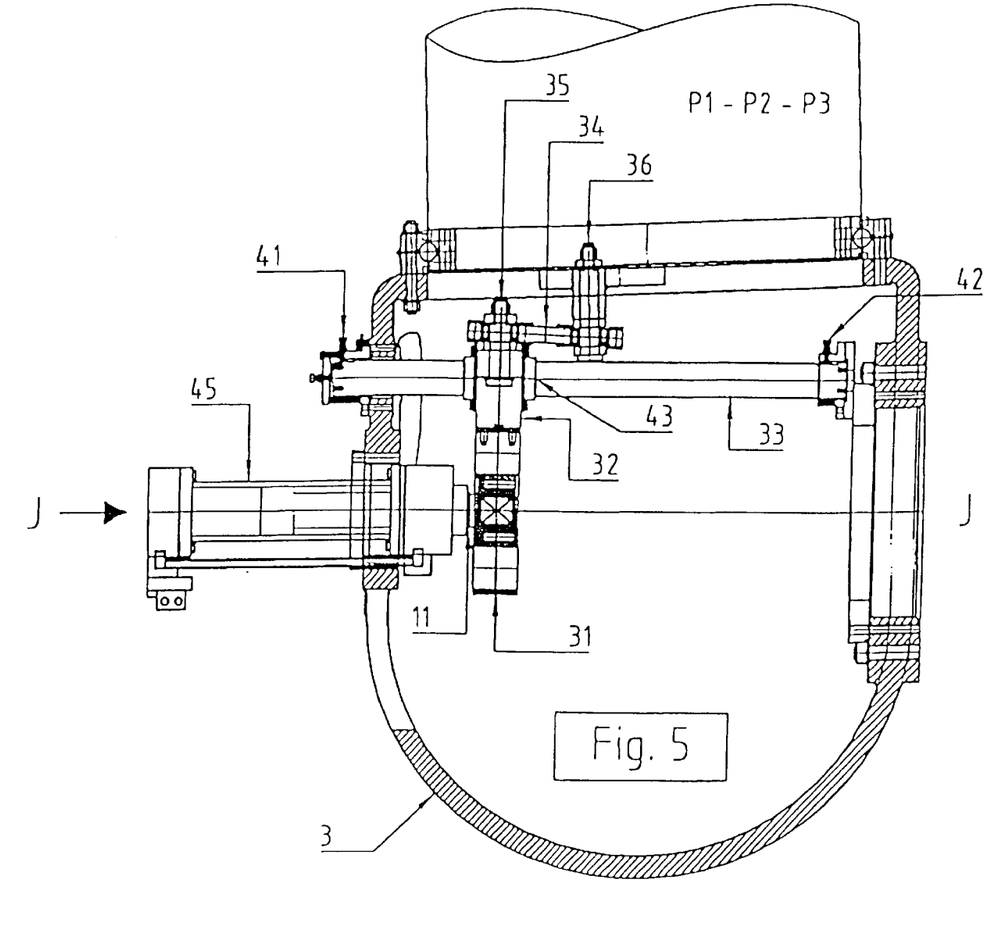

FIGS. 3, 4 and 5 show an exemplary embodiment of a device in accordance with the present invention. FIG. 3 shows a frontal view (i.e. looking straight on the front of the wind turbine along the direction J), whereas FIGS. 4 and 5 show a cross sectional view along line I—I of FIG. 3. The device comprises a pitch change shaft 11 and a hydraulic system 45 that translates the pitch change shaft 11 back and forth. To the pitch change shaft 11 an hexagonal shaped block 31 is provided to which three gliding means 32 are attached. Each gliding means 32 has a central bore through which a guide shaft 33 extends. Coupling submeans couple the gliding means 32 to the blade P1. These coupling submeans each comprise, in one embodiment, a coupling bar 34 and two coupling pins 35 and 36. Because of the presence of the gliding means 32 and the guide shafts 33, the main forces acting on the pitch change shaft are along the J direction. Transversal forces on the pitch change system are strongly reduced if not eliminated. As a consequence, a movement of the pitch change shaft 11 is more precisely correlated (because the transversal forces are strongly reduced and thus the possible twisting movement of the pitch change shaft is reduced) with the pitch angle of the blades. Thus the pitch is advantageously more controllable. This increased pitch angle control increases the efficiency of the device. The reduction (and preferably elimination) of transversal forces furthermore reduces wear and tear on the pitch change shaft 11. In this embodiment, the guide shafts 33 are arranged at substantially equal distances from the central pitch change shaft 11, and are arranged in a symmetrical arrangement around the central pitch change shaft 11. Such a symmetric pattern of the guide shafts 37 around the central pitch change shaft 11 further reduces the occurrence of transversal forces, giving a symmetric pattern of reaction forces, and reducing or avoiding asymmetric loads on the central pitch change shaft 11.

Through provision of the three guide shafts (three in this example, but there could be two or more depending on the number of blades) pitch control is improved, and wear and tear and transversal forces are reduced. However, such improvements maybe less than optimal if the guide shafts 33 are insufficiently aligned. In such a case, the center of force of the three guide shafts 33 may not coincide with the central axis of the pitch change shaft 11. When that happens, a force transversal to the pitch change shaft could be generated, thereby pulling the pitch change shaft 11 to one side, resulting in reduced angle pitch control and increased wear and tear. To reduce these problems and further improve the efficiency of the device, the guide shafts 33 are, in preferred embodiments, provided with adjustment means for adjusting the position and orientation of the guide shafts. In one embodiment, for example, each guide shaft 33 is provided with adjustment means 41 and 42 at or near each end as shown in more detail in FIG. 6.

Figure 6A:
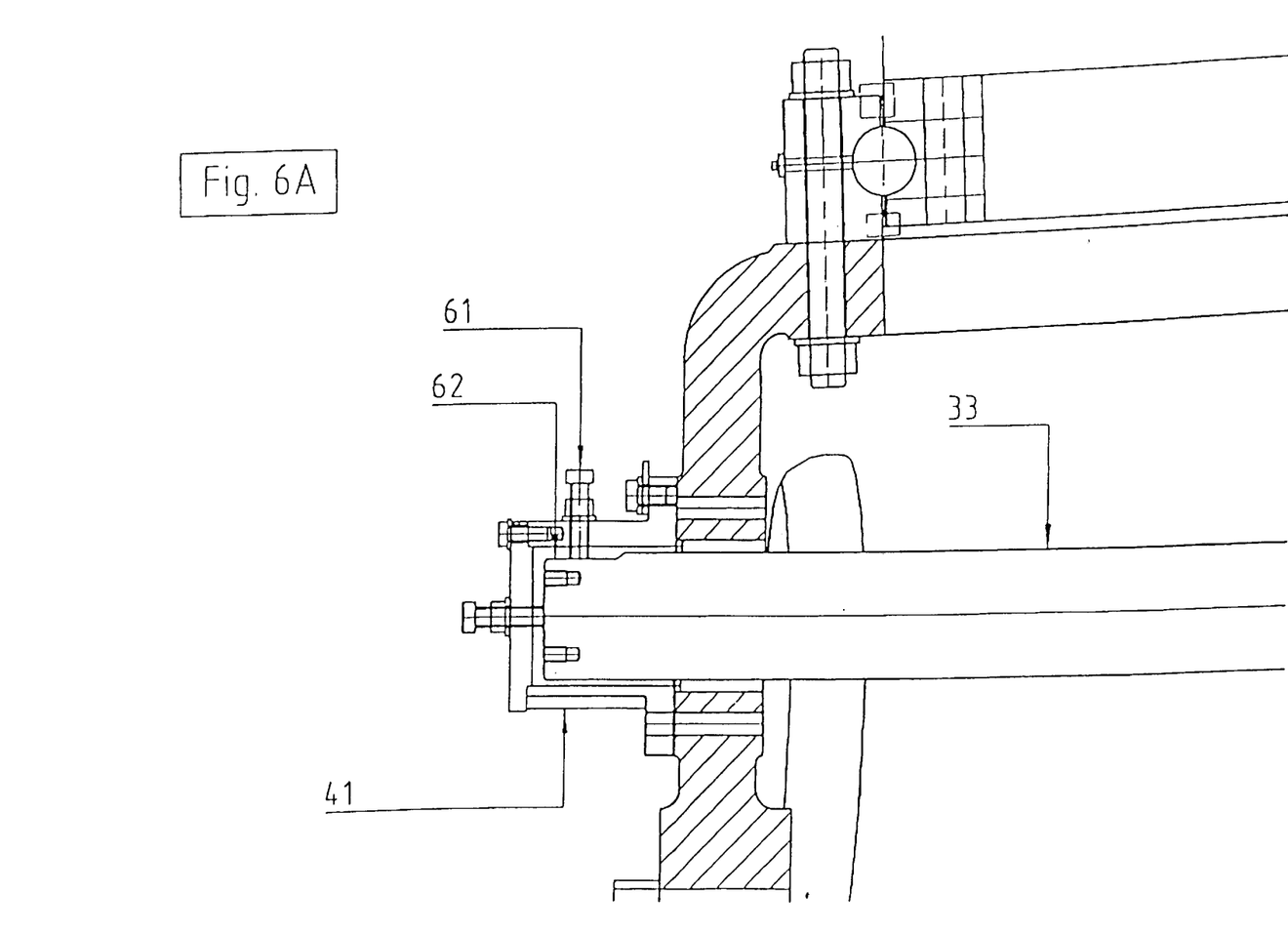
FIG. 6 illustrates a means for adjusting the position and direction of a guide shaft in accordance with the invention.
Figure 6B:
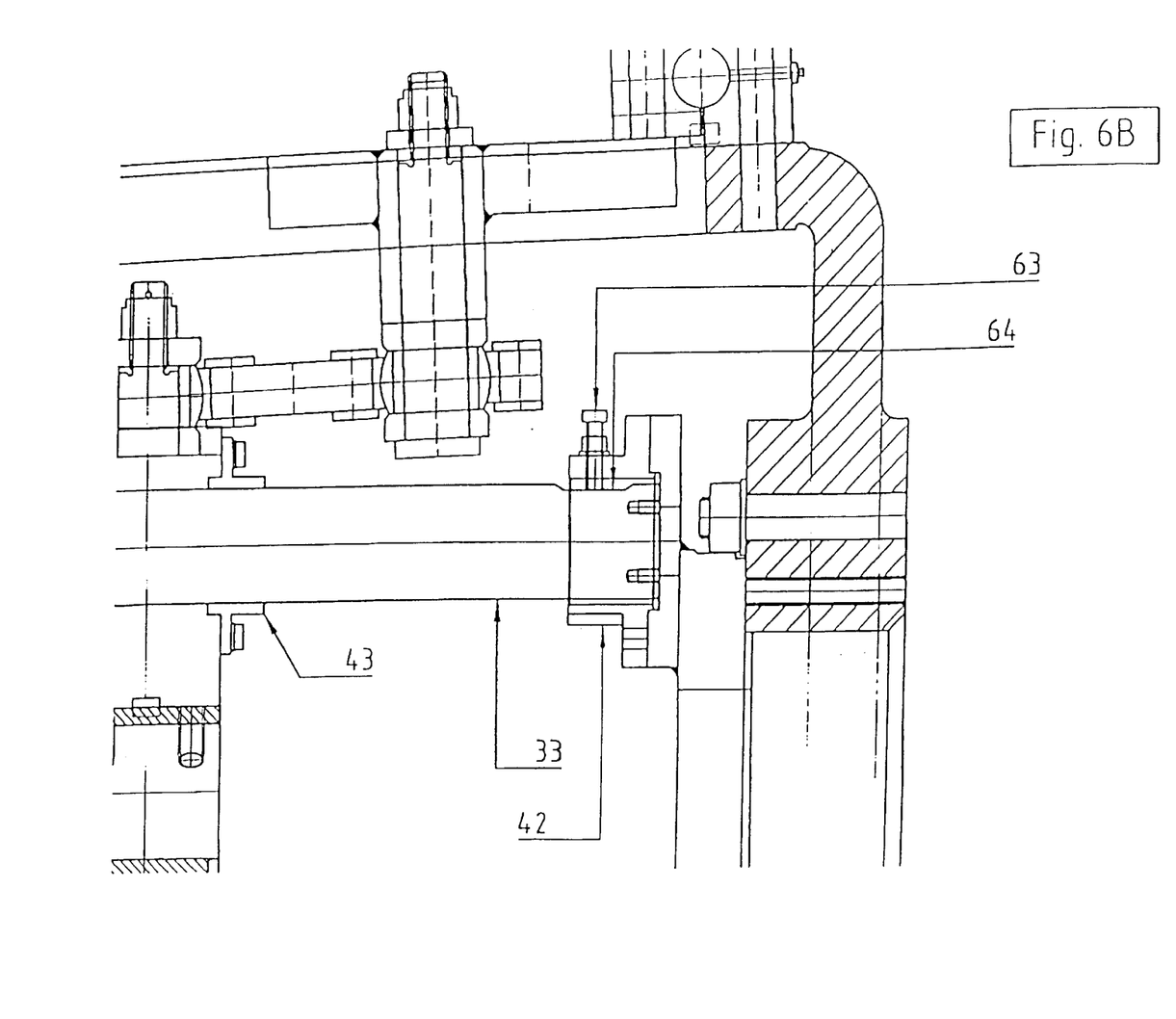

Each end of the guide shaft 33 is provided with adjustment means 41 or 42. The adjustment means 41 and 42 comprise, in one embodiment, adjustment bolts 61 and 63, respectively, which lie against flat areas 62 and 64. It should be appreciated that 3 or more bolts may be used at the end of each guide shaft 33. In one embodiment, 6 bolts are used at each end. Furthermore, the bolts are preferably arranged in a pattern of pairs of bolts having the center axis of the guide shaft approximately halfway in between each pair of bolts. In such a pattern, torque on a guide shaft resulting from the forces exerted on the guide shaft by the bolts is smaller than when, e.g., 3 bolts are used. The provision of the flat areas also has a positive effect, enabling the force exerted by the bolts on the guide shaft 33 to be better oriented towards the center axis of the guide shaft 33. The adjustment means enable the guide shafts to be oriented and aligned and to be fixed in the aligned positions. Such alignment may most efficiently be done by setting the adjustment means using the two extremal positions (ends of the stroke) of the pitch change shaft 11.

The adjustment means 41 and 42 enable an accurate positioning and alignment of the guide shaft 33. Such a precise alignment reduces (or even avoids) occurrence of internal hyperstatic reaction forces in the pitch mechanism. Such reaction forces are a cause of reduction of precision of pitch angle control and of wear and tear.

Using six bolts equally distributed on a circle enables all six degrees of freedom to be determined. The bolts could be replaced by other means such as inch worms (piezoelectric elements). The bolts could also be replaced by pins which may be positioned electrically or hydraulically.

Figure 7:
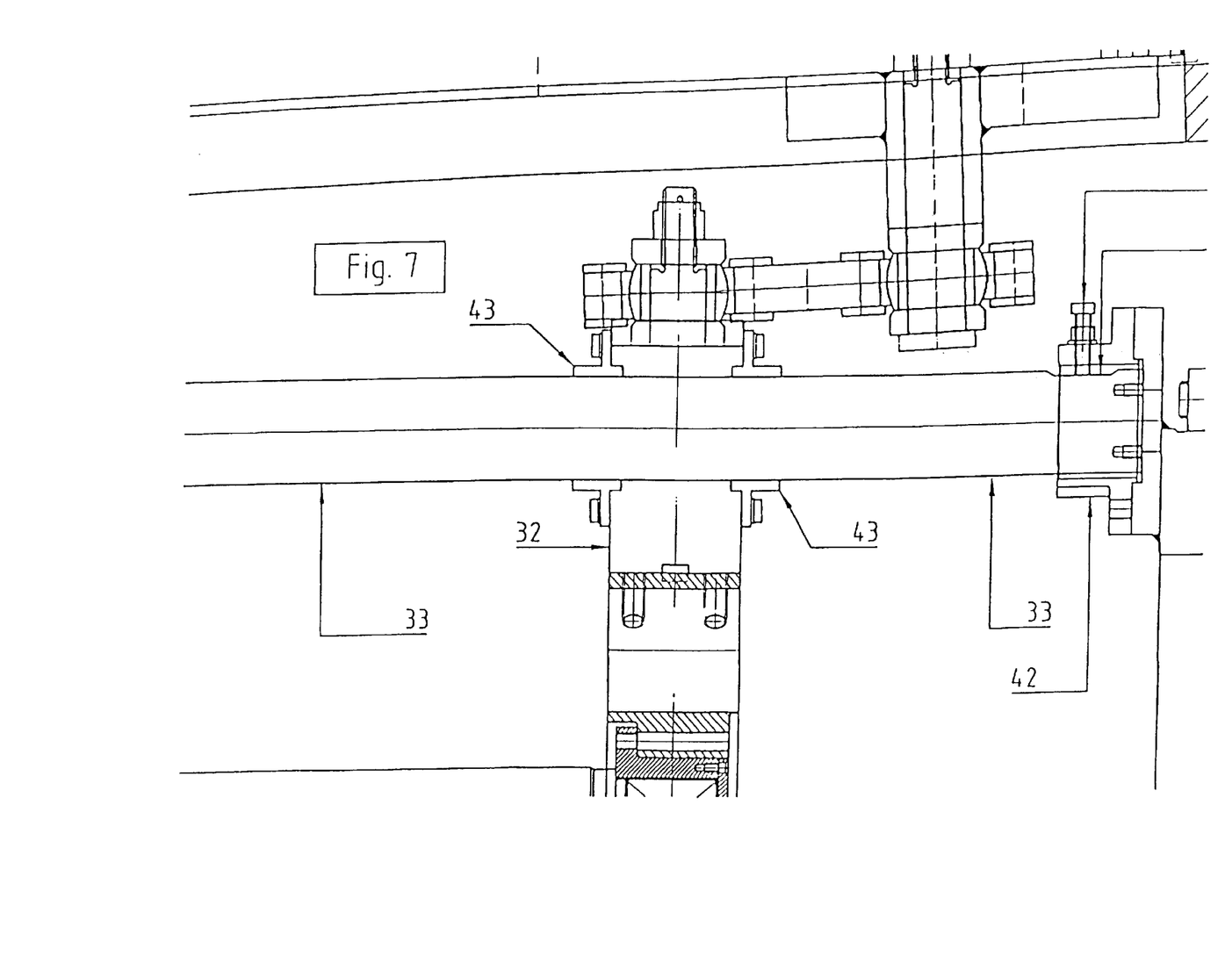
FIG. 7 illustrates a gliding means in accordance with the invention.

The gliding means 32 glide over the guide shaft 33 and form themselves a possible source of friction and loss of power. FIG. 7 shows an aspect of the invention to reduce such friction. Gliding means 32 are, at each end, provided with sleeves or bushings 43, separated some distance from each other along the guide shaft 33. Initially the bore diameter one of said bushings is slightly smaller than the other. The back and forth movement of the gliding means 32 along the guide shaft 33 will cause the bushing having the smaller bore diameter to wear down until the diameter of said bushing equals that of the other. The friction will then be distributed substantially evenly over the two bushings, doubling the contact surface which results in a drastic reduction of the wear rate of the bushings. The lifetime of the bushings is increased when compared with use of a single bushing. In relation to, and in combination with, the use of the adjustment means 41 and 42, especially when the adjustment means are used at or near both ends of the guide shafts, it is remarked that making both bushings with the same initial bore diameter would make guide shaft alignment much more difficult, since the two bushings would reduce the possibility of movement and especially of alignment of the guide shaft.

The above described system advantageously provides for a balanced and properly alignable system. Such balancing and alignment result in the following advantages, which may be obtained separately but in the shown embodiments are obtained in toto:

Precision in pitch control which in turn results in correct power control of the device, i.e. in this example the wind turbine.

Symmetric pattern of the reaction forces avoiding asymmetric loads on the central pitch change shaft which further increases pitch control and reduces wear and tear.

Precision alignment, reducing or even avoiding internal hyperstatic reaction forces in the pitch system, and even further increasing pitch control and reducing wear and tear.

Precision fitting of the gliding means, while yet enabling alignment.

It will be clear that within the framework of the present invention many variations are possible.

Fluid within the scope of the present invention comprises gases (such as air, i.e. wind) as well as liquids (such as water). Although, the present invention has been described with reference to a wind turbine, it should be appreciated that the present invention may also be used in a wind generator, a water turbine and other similar devices.

Horizontal direction is to be understood to represent the main direction of flow of the fluid, as indicated by J in the Figures. For a wind turbine, the J direction is usually substantially the horizontal direction. A wind machine may be oriented at an angle to the horizontal direction. In such circumstances 'the horizontal direction' represents the direction of the generated wind. Likewise a water turbine may be oriented at an angle to the horizontal direction.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus having two or more radially placed blades capable of being rotated, and having a pitch system for regulating the pitch of the two or more blades, the pitch system comprising a pitch change shaft substantially extending in a horizontal direction, and coupling means coupling the pitch change shaft and the blades, said coupling means effecting a change in the pitch of the blades upon translation of the pitch change shaft, wherein the coupling means comprises, for each blade, a guide shaft extending substantially parallel to each other and substantially parallel to the pitch change shaft, first sub-coupling means coupling the pitch change shaft to the relevant guide shaft, said first sub-coupling means comprising guide shaft sliding means, and second sub-coupling means coupling the guide shaft sliding means to the corresponding blade.

2. An apparatus as claimed in claim 1, wherein the guide shafts are placed at substantially equal distances from the pitch change shaft, and are arranged in a substantially symmetrical arrangement around the pitch change shaft.

3. An apparatus as claimed in claim 1 or 2, wherein each guide shaft is provided with adjustment means for adjusting the position and orientation of the guide shaft.

4. An apparatus as claimed in claim 3, wherein the adjustment means comprises two or more adjustment sub-means separated from each other along the guide shaft.

5. An apparatus as claimed in claim 4, wherein a first and a second adjustment sub-means are located proximal either end of each guide shaft.

6. An apparatus as claimed in claim 5, wherein the first and second adjustment sub-means each comprise 3 or more adjustments bolts in an adjustment sleeve.

7. An apparatus as claimed in claim 6, wherein the first and second adjustment sub-means each comprise six bolts evenly distributed around the guide shaft.

8. An apparatus as claimed in claim 6 or 7, wherein each guide shaft comprises a flat area for each adjustment bolt, the normal of the area being parallel to the longitudinal axis of the corresponding bolt.

9. An apparatus as claimed in claim 1, wherein each sliding means comprises two sliding sleeves separated from each other along the guide shaft, the inner diameters of said sliding sleeves exhibiting initially a difference.

10. An apparatus as claimed in claim 1, wherein the apparatus is implemented in a device that generates movement in a fluid by rotating the blades.

11. An apparatus as claimed in claim 1, wherein the apparatus is implemented in a device that converts the power of a moving fluid to electric energy by the fluid rotating the blades.

12. A pitch control system for controlling the pitch angle of two or more blades, comprising:

a pitch control shaft having a central translation axis; and a coupling system for coupling the pitch control shaft to the two or more blades, the coupling system comprising, for each blade:

a guide shaft extending substantially parallel to the pitch control shaft;

a guide shaft coupler, slidably coupled to the guide shaft, for coupling the guide shaft to the pitch control shaft; and a blade coupler for coupling the guide shaft coupler to the blade, wherein the coupling system is arranged such that controlled movement of the pitch control shaft along the central translation axis causes a corresponding change in the pitch angle of the two or more blades.

13. The pitch control system of claim 12, wherein the guide shafts are located at substantially equal distances from the pitch change shaft, and wherein the guide shafts are arranged substantially symmetrically around the pitch change shaft.

14. The pitch control system of claim 12, farther comprising, for each guide shaft, an adjustment means for adjusting the position and orientation of the guide shaft.

15. The pitch control system of claim 14, wherein each adjustment means includes, proximal each end of the guide shaft, three or more adjustment bolts in contact with the guide shaft.

16. The pitch control system of claim 14, wherein each adjustment means includes, proximal each end of the guide shaft, six adjustment bolts evenly distributed around the guide shaft.

17. The pitch control system of claim 15 or 16, wherein each guide shaft includes a flat area for each adjustment bolt, the normal of each flat area being parallel to a longitudinal axis of each bolt, and substantially perpendicular to the central axis of the guide shaft.

18. The pitch control system of claim 12, wherein each guide shaft coupler includes two sliding sleeves separated from each other along the guide shaft, wherein the inner diameters of the two sliding sleeves are initially different.

19. The pitch control system of claim 12, wherein the pitch control system is implemented in one of a windmill, wind motor, wind machine or wind turbine.

* * * * *